B. F. MILLER.
SEED-PLANTER.
No. 187,546. Patented Feb. 20, 1877.
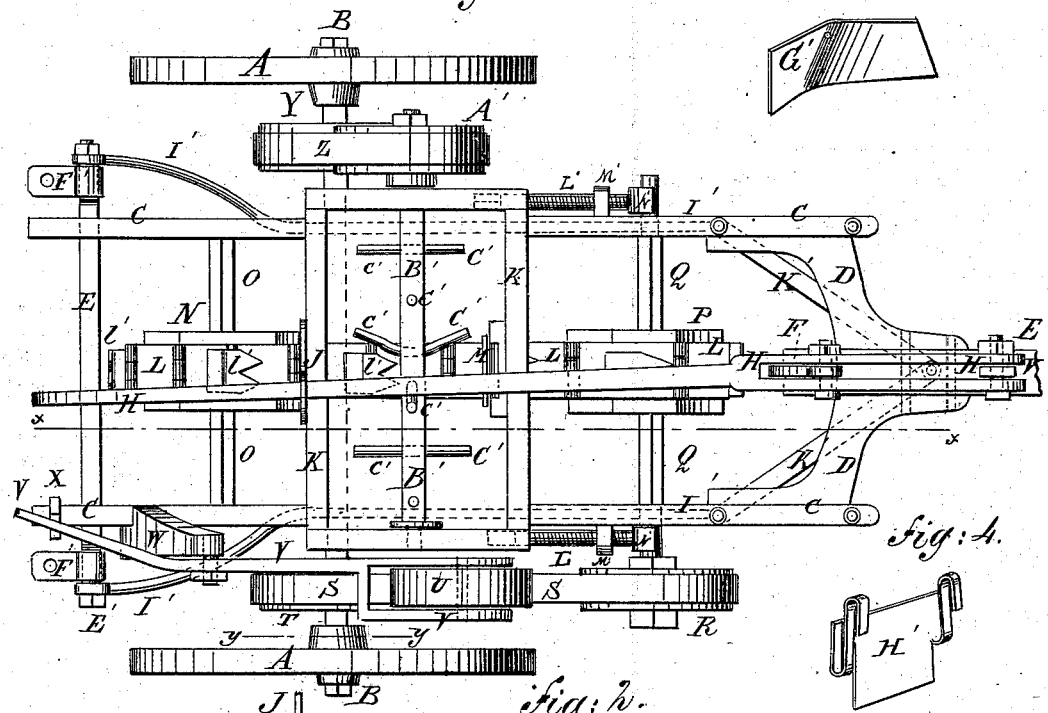
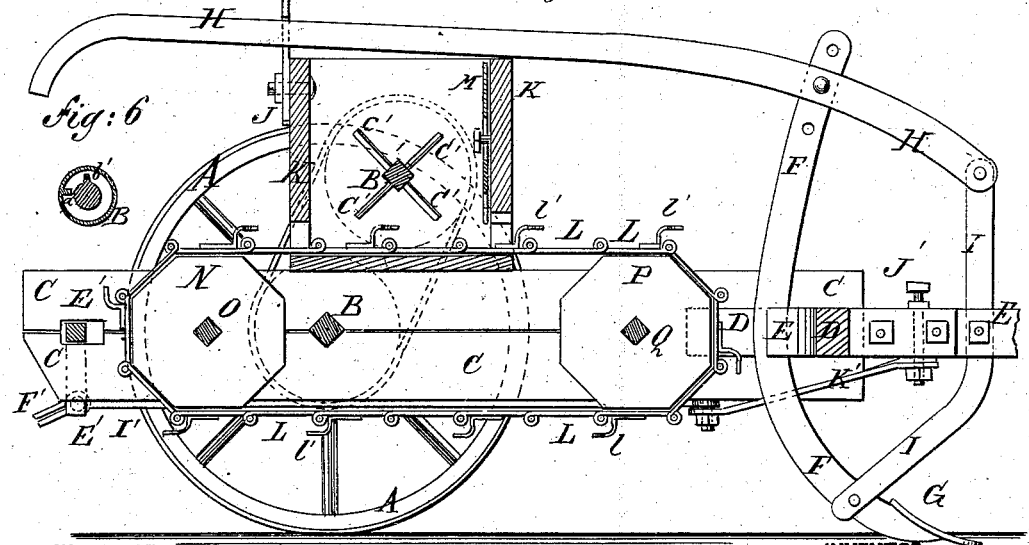
WITNESSES:
INVENTOR:
B. F. Miller
BY
ATTORNEYS.

UNITED STATES PATENT OFFICE.

BENJAMIN F. MILLER, OF GATESVILLE, TEXAS.

IMPROVEMENT IN SEED-PLANTERS.

Specification forming part of Letters Patent No. 187,546, dated February 20, 1877; application filed November 20, 1876.

*To all whom it may concern:*

Be it known that I, BENJAMIN FRANKLIN MILLER, of Gatesville, in the county of Coryell and State of Texas, have invented a new and useful Improvement in Seed-Planter, of which the following is a specification:

Figure 1 is a top view of my improved planter. Fig. 2 is a vertical section of the same, taken through the line $x\ x$, Fig. 1. Fig. 3 is a longitudinal section and top view of a portion of the endless-chain dropper for corn. Fig. 4 is a detail view of a wing to prevent the seed from being blown away while dropping to the ground. Fig. 5 is a detail view of one of the plows. Fig. 6 is a detail section of the hub and axle, taken through the line $y\ y$, Fig. 2.

Similar letters of reference indicate corresponding parts.

The object of this invention is to furnish an improved machine for planting cotton, and also for planting corn and other smooth seed, which shall be simple in construction, convenient in use, and effective in operation with either adjustment.

The invention will first be described in connection with the drawing, and then pointed out in the claims.

A are the wheels, which are placed upon the journals of the axle B, and are made to carry said axle with them in their revolution by projections attached to the inner parts of the hubs of said wheels, and which strike against projections $b'$, formed upon the inner part of the journals of said axle. The axle B revolves in bearings attached to the two bars C, which ride upon the axle B, and to the forward ends of which are attached the hounds D, having the tongue E bolted to and between them. The rear end of the tongue E has a slot formed in it, through which passes the standard F, having a plow, G, attached to its lower end. The upper end of the standard F is pivoted to a lever, H, several holes being formed in the said standard F to receive the pivoting-bolt, so that the plow may be conveniently adjusted to open a furrow of any desired depth.

To the forward end of the lever H is pivoted the upper end of a lever, I, which passes down through a slot in the tongue E, and is pivoted to said tongue. The lower part of the lever I is bent to the rearward, and is pivoted to the lower part of the standard F, so that the pitch of the plow G may be changed, as desired. The rear end of the lever H moves along an upright bar, J, which has notches formed in it to receive the said lever H, and support it in either position. The lower end of the catch-bar J is rigidly attached to the rear side of the seed-hopper K, which is secured to the bars C.

The cotton-seed is drawn out of the hopper K by an endless chain of flat links L, hinged to each other, and provided with hooks or claws $l'$. The chain L crosses the bottom of the hopper K through openings in the front and rear sides of said hopper.

The amount of seed carried out by the endless chain L $l'$ is regulated by the plate M, placed upon the inner surface of the front side of the hopper K, and having a slot formed in its middle part, to receive the bolt by which it is secured in place, so that by loosening the said bolt the said plate M may be raised or lowered to allow more or less seed to pass out. One end of the plate M is notched, to adapt it for use in planting cotton, and the other end is made straight, to adapt it for use in planting corn.

The rear part of the endless chain L $l'$ passes around an octagonal pulley, N, the faces of which are of the same size as the links L. The pulley N is attached to the shaft O, that revolves in bearings in the bars C. The forward part of the chain L $l'$ passes around a similar octagonal pulley, P, attached to the shaft Q. The shaft Q revolves in bearings in slots in the bars C, and to one of its ends is attached a pulley, R, around which passes a band, S. The band S also passes around a pulley, T, attached to the axle B, so that the chain L $l'$ may be operated to drop the seed by the advance of the machine. The band S is made of such a length that when left free it will be so slack that it will not drive the seed-dropping mechanism. The band S is tightened, to cause it to drive the dropping mechanism, by an idler, U, pivoted to the lever V, which is pivoted to an upright, W, attached to the bar C. The rear part of the lever V moves along an upright, X, attached to the bar C, and in which are formed notches to receive the lever V and hold it when in either position. To the axle B at the other side of the machine is attached a pulley, Y, around which passes a band, Z. The band Z also passes around a pulley, A', attached to the end of a shaft, B', which revolves in bearings in the ends of the hopper K.

To the shaft B' within the hopper K are attached pins C', so that the stirrer B' C' may be revolved to keep the seed stirred up by the advance of the machine. When the machine is to be used for planting corn and other smooth seed, the endless chain L l' is removed, and is replaced by an endless chain of plates or links, D', hinged to each other, and in which are formed recesses or cups d', of such a size as to hold the proper amount of seed to be taken out at a time. To the rear ends of the bars C is attached a cross-bar, E', the ends of which are bent downward and then outward, and have clevises F' placed upon them, to receive the ends of the beams of the covering-plows.

The plow-plates G', one of which is shown in Fig. 5, are so formed as to raise the soil and move it inward to fill the furrow and cover the seed. H' are wings, which are attached to the machine upon the opposite sides of the forward part of the endless chains, to prevent the seed from being scattered or blown to one side of the furrow. The draft-strain upon the bent bar E' is sustained by bars I', which incline inward to, and extend along the lower edge of, the bars C, to which they are securely attached. To the rear part of the tongue E is attached a bolt, J', to which the draft is applied, and which is strengthened against the draft-strain by the braces K', the forward ends of which are attached to the lower end of said bolt, and their rear ends are attached to the bars C. The shaft Q is held forward in its slots by the screws L', which pass through nuts M', attached to the bars C, and to the forward ends of which are swiveled half-bearings N', which bear against the sides of the said shaft. The pulleys and bands may be replaced with gear-wheels, if desired.

Having thus described my invention, I claim as new and desire to secure by Letters Patent—

1. The combination of hounds D, tongue E, standard F, and levers H I, the lever I and standard F bent toward each other, while said lever I is pivoted in the tongue in front of the hounds, as shown and described.

2. The combination of the bar E', bent twice at right angles at each end, the clevises F', and the brace-bars I', with the bars C, substantially as herein shown and described.

BENJAMIN F. MILLER.

Witnesses:
F. W. FAUNTLEROY,
L. M. ALLEN.